United States Patent
Minami et al.

(10) Patent No.: US 7,109,283 B2
(45) Date of Patent: Sep. 19, 2006

(54) HIGHER α-OLEFIN COPOLYMERS AND PROCESS FOR PREPARATION THEREOF

(75) Inventors: Yutaka Minami, Ichihara (JP); Takenori Fujimura, Ichihara (JP); Masanori Sera, Ichihara (JP); Tomoaki Takebe, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 11/324,304

(22) Filed: Jan. 4, 2006

(65) Prior Publication Data
US 2006/0111526 A1    May 25, 2006

Related U.S. Application Data

(63) Continuation of application No. 10/925,037, filed on Aug. 25, 2004, now Pat. No. 7,019,091.

(30) Foreign Application Priority Data
Aug. 29, 2003 (JP) .............................. 2003-307164

(51) Int. Cl.
*C08F 10/14* (2006.01)

(52) U.S. Cl. .................................................. 526/348.3
(58) Field of Classification Search .............. 526/348.3
See application file for complete search history.

(56) References Cited

U.S. PATENT DOCUMENTS 4,990,424 A * 2/1991 Van Dusen et al. ...... 430/108.8
5,187,250 A * 2/1993 Asanuma et al. ........ 526/348.6

FOREIGN PATENT DOCUMENTS

EP    1 428 855 A1    6/2004

OTHER PUBLICATIONS

Patent Abstracts of Japan, JP 2003-165878, Jun. 10, 2003.
Patent Abstracts of Japan, JP 2003-096212, Apr. 3, 2003.

\* cited by examiner

*Primary Examiner*—Roberto Rabago
(74) *Attorney, Agent, or Firm*—Oblon, Spivak, McClelland, Maier & Neustadt, P.C.

(57) ABSTRACT

The present invention provides a crystalline higher α-olefin copolymer obtained by copolymerizing at least two higher α-olefins having 10 or more carbon atoms or at least one higher α-olefin having 10 or more carbon atoms with at least one other olefin, wherein it satisfies certain conditions.

8 Claims, No Drawings

HIGHER α-OLEFIN COPOLYMERS AND PROCESS FOR PREPARATION THEREOF

This application is a Continuation of U.S. application Ser. No. 10/925,037, filed on Aug. 25, 2004, now U.S. Pat. No. 7,019,091.

TECHNICAL FIELD

The present invention relates to crystalline higher α-olefin copolymers obtained by copolymerization of at least two higher α-olefins having 10 or more carbon atoms or of at least one higher α-olefin having 10 or more carbon atoms with at least one other olefin, which are useful as a modifying agent for resins, a tackifying agent, an adhesive, a lubricant, an organic-inorganic composite material, a heat storage material, a modifying agent for fuel oils such as light oil, a modifying agent for asphalt, and a high-performance wax, and to a process for preparation thereof.

BACKGROUND ART

Studies on polymerization of higher α-olefins having 10 or more carbon atoms predominantly using Ziegler-Natta catalysts have already been conducted (for example, Japanese Unexamined Patent Application Publication No. 7-145205, Polymer J., 10, 619 (1978), Macromol. Chem., 190, 2683 (1989) and Makromol. Chem., Rapid Comm., 13, 447 (1992)).

However, these higher α-olefin polymers disclosed by the above documents are observed to be inhomogeneous such that the molecular weight is low, the melting point is high owing to high regularity, or two melting points appear in one polymer material.

Furthermore, it is also disclosed that higher α-olefin polymers can be obtained by using homogeneous catalysts called metallocene catalysts (For example, Macromol. Sci. Pure Appl. Chem., A35, 473 (1998), J. Polym. Sci. A, 38, 233 (2000), Macromol. Mater. Eng., 286, 350 (2001) and Macromol. Mater. Eng., 286, 480 (2001)).

However, the above-mentioned polymers do not have sufficiently high molecular weights and appear to be inhomogeneous such that the melting point is high owing to high regularity and also that two melting points appear in one polymer material, being similar to the polymers obtained by using heterogeneous catalysts.

Presence of a plurality of melting points appearing in one polymer material represents inhomogeneity in the size of crystals or the like, possibly causing tackiness.

When such a polymer is mixed with other materials to be used as a modifying agent, homogeneous blending may not be carried out, and desired modified properties may not be obtained.

Further, for the use as a heat storage material, it is preferred for a material to have rapid heat dissipation and absorption resulting from rapid melting or crystallization at a specific temperature with regard to efficiency improvement, and thus it is difficult to use an inhomogeneous resin for the purpose.

DISCLOSURE OF THE INVENTION

An object of the present invention is to provide crystalline high α-olefin copolymers which have excellent compatibility with thermoplastic resins, especially polyolefins, and compatibility with lubricant oils, fuel oils or waxes, excellent miscibility with inorganic fillers and secondary processability, and which have narrow temperature ranges for melting and crystallization, and to provide a process for preparation thereof.

The inventors have conducted extensive studies in order to solve the above-mentioned problems, and have found that the problems can be solved by crystalline higher α-olefin copolymers obtained by copolymerization of at least two higher α-olefins having 10 or more carbon atoms or of at least one higher α-olefin having 10 or more carbon atoms with at least one other olefin, and that it is possible to produce efficiently such copolymers using specific metallocene catalysts, thus completing the present invention.

Therefore, the present invention is to provide the following:

1. A crystalline higher α-olefin copolymer obtained by copolymerizing at least two higher α-olefins having 10 or more carbon atoms or at least one higher α-olefin having 10 or more carbon atoms with at least one other olefin, wherein it satisfies the following (1) to (3):

(1): the content of higher α-olefin units is 50 mol % or greater, (2): the melting point (Tm) which is measured, by using a differential scanning calorimeter (DSC), from the melting endothermic curve obtained by maintaining the copolymer at 190° C. for 5 minutes under a nitrogen atmosphere, cooling it to −10° C. at a rate of 5° C./min, maintaining it at −10° C. for 5 minutes, and then elevating its temperature to 190° C. at 10° C./min is in the range of 20 to 100° C., and (3): in the intensity distribution of wide-angle X-ray scattering, a single peak X1 resulting from crystallization of side chains is observed at 15 deg<2θ<30 deg.

2. The crystalline higher α-olefin copolymer according to the above 1, wherein the weight-average molecular weight (Mw) measured by gel permeation chromatography (GPC) with respect to polystyrene is in the range of 1,000 to 10,000,000, and the molecular weight distribution (Mw/Mn) is 5.0 or less.

3. The crystalline higher α-olefin copolymer according to the above 1 or 2, wherein the stereoregularity index M2 derived from the linkages of higher α-olefins having 10 or more carbon atoms is 50 mol % or more.

4. The crystalline higher α-olefin copolymer according to any one of the above 1 to 3, wherein the half-width (Wm) which is measured from the melting endothermic curve obtained by using a differential scanning calorimeter is 10° C. or less.

5. A process for preparation of the crystalline higher α-olefin copolymer according to the above 1, comprising copolymerizing at least two higher α-olefins having 10 or more carbon atoms or at least one higher α-olefin having 10 or more carbon atoms with at least one other olefin, in the presence of a polymerization catalyst containing (A) a transition metal compound represented by the following formula (I), and (B) a compound capable of forming an ionic complex by reacting with the transition metal compound of the component (A) or its derivative (B-1) and at least one component selected from aluminoxanes (B-2):

(wherein M represents a metallic element of Groups 3 to 10 of the Periodic Table or the lanthanoid series;

Each of $E^1$ and $E^2$ represents a ligand selected from a substituted cyclopentadienyl group, an indenyl group, a substituted indenyl group, a heterocyclopentadienyl group, a substituted heterocyclopentadienyl group, an amido group, a phosphido group, a hydrocarbon group or a silicon-containing group, they form a crosslinked structure via $A^1$ and $A^2$, and they may be the same or different from each other;

X represents a σ-bonding ligand, and a plurality of X, if any, may be the same or different from each other, and may be crosslinked with other X, $E^1$, $E^2$ or Y;

Y represents a Lewis base, and a plurality of Y, if any, may be the same or different from each other, and may be crosslinked with other Y, $E^1$, $E^2$ or X;

Each of $A^1$ and $A^2$ is a divalent crosslinking group via which the two ligands are bonded to each other and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —P(O) $R^1$—, —$BR^1$— or —$AlR^1$— wherein $R^1$ represents a hydrogen atom, a halogen atom, a hydrocarbon group having 1 to 20 carbon atoms, or a halogen-containing hydrocarbon group having 1 to 20 carbon atoms, and they may be the same or different from each other;

q is an integer of 1 to 5 and represents [(valency of M)–2]; and r represents an integer of 0 to 3).

THE MOST PREFERRED EMBODIMENT TO CARRY OUT THE INVENTION

The present invention is described in detail below.

First, the crystalline higher α-olefin copolymers of the present invention are obtained by copolymerizing at least two higher α-olefins having 10 or more carbon atoms or at least one higher α-olefin having 10 or more carbon atoms with at least one other olefin.

For the other olefin, an olefin having 2 to 30 carbon atoms can be used, the preferred being an α-olefin.

Examples of the α-olefin include ethylene, propylene, 1-pentene, 4-methylpentene-1,1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene or the like. Among these, one or two or more α-olefins may be used.

Further, as a higher α-olefin having 10 or more carbon atoms, an α-olefin having 10 to 35 carbon atoms may be used, including, for example, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene or the like. Among these, one or two or more α-olefins can be used.

When the α-olefins used in copolymerization have 10 or more carbon atoms, the higher α-olefin copolymer obtained by copolymerization thereof has high crystallinity and improved strength without tackiness.

Further, when the α-olefins used in copolymerization have 35 or less carbon atoms, the higher α-olefin copolymer obtained by copolymerization thereof comprises less unreacted monomers and has a homogeneous composition with a narrow temperature range for melting and crystallization.

The content of a higher α-olefin unit having 10 or more carbon atoms in the crystalline higher α-olefin copolymer of the present invention is 50 mol % or more, preferably 70 to 100 mol %, and more preferably 85 to 100 mol %.

In particular, a copolymer consisting only of higher α-olefins having 10 or more carbon atoms is preferred.

When the content of a higher α-olefin unit having 10 or more carbon atoms is 50 mol % or more, a crystalline copolymer is obtained, and due to its low melting point, the polymer has improved compatibility with various materials such as solvents, oils, asphalt, lubricants and the like.

Meanwhile, for a homopolymer of higher α-olefin having 10 or more carbon atoms, it has been difficult to control the melting point and crystallinity of the polymer. However, by copolymerizing two or more higher α-olefins having 10 or more carbon atoms, or by copolymerizing one or more higher α-olefins having 10 or more carbon atoms with one or more other olefins, the control of the melting point (heat resistance and secondary processability) and crystallinity (solubility and modifying effect) of the copolymer became easy, and the secondary processability and solubility in solvents were improved.

The crystalline higher α-olefin copolymer of the present invention is obtained by copolymerizing at least two higher α-olefins having 10 or more carbon atoms or by copolymerizing at least one higher α-olefin having 10 or more carbon atoms with at least one other olefin, and is a copolymer satisfying the following requirements (1) to (3), preferably satisfying the following requirements 2 to 4:

(1): the content of higher α-olefin units is 50 mol % or greater, (2): the melting point (Tm) which is measured, by using a differential scanning calorimeter (DSC), from the melting endothermic curve obtained by maintaining the copolymer at 190° C. for 5 minutes under a nitrogen atmosphere, cooling it to –10° C. at a rate of 5° C./min, maintaining it at –10° C. for 5 minutes, and then elevating its temperature to 190° C. at 10° C./min is in the range of 20 to 100° C., and (3): in the intensity distribution of wide-angle X-ray scattering, a single peak X1 resulting from crystallization of side chains is observed at 15 deg<2θ<30 deg.

2. The weight-average molecular weight (Mw) measured by gel permeation chromatography (GPC) with respect to polystyrene is in the range of 1,000 to 10,000,000, and the molecular weight distribution (Mw/Mn) is 5.0 or less.

3. The stereoregularity index M2 derived from the linkages of higher α-olefins having 10 or more carbon atoms is 50 mol % or more.

4. The half-width (Wm) which is measured from the melting endothermic curve obtained by using a differential scanning calorimeter is 10° C. or less.

The melting point (Tm) of the crystalline higher α-olefin copolymer of the present invention is in the range of 20 to 100° C., preferably 25 to 100° C., and more preferably 25 to 80° C.

The crystalline higher α-olefin copolymer of the present invention having a melting point in such ranges hardly causes generation of tackiness at room temperature, has excellent storability and secondary processability, and can be dissolved uniformly at low temperatures, thus showing excellent processability.

The crystalline higher α-olefin copolymer of the present invention exhibits a single peak X1 resulting from the crystallization of side chains, which is observed at 15 deg<2θ<30 deg in the intensity distribution of wide-angle X-ray scattering.

In the intensity distribution of wide-angle X-ray scattering, when a peak resulting from side chain crystallization is not observed, there is tackiness, and in addition strength is greatly lowered.

Furthermore, if the peak resulting from side chain crystallization is not single, the crystalline portion of the copolymer becomes wide and causes tackiness and lowered strength. In particular, as the shape of the melting peak does not become sharp, it leads to a decrease in the storability and the secondary processability.

(Method of Measuring the Intensity Distribution of Wide-angle X-Ray Scattering)

Using an anticathodic rotor flex RU-200 manufactured by Rigaku Denki K. K., a monochromatic light of CuKα ray (wavelength=1.54 Å) with an output power of 30 kV and 100 mA was collimated through a pinhole with a diameter of 1.5 mm, and the intensity distribution of wide-angle X-ray scattering (WAXS) was measured for 1 minute of light exposure by means of a position-sensitive proportional counter.

The crystalline higher α-olefin copolymer of the present invention has a weight-average molecular weight (Mw) measured by gel permeation chromatography (GPC) with respect to polystyrene in the range of 1,000 to 10,000,000, and more preferably in the range of 10,000 to 10,000,000.

When the molecular weight (Mw) is more than 1,000, the crystalline higher α-olefin copolymer improves strength; and when Mw is less than 10,000,000, processing and kneading become easier.

Further, the crystalline higher α-olefin copolymer of the present invention preferably has a molecular weight distribution (Mw/Mn) measured by GPC of 5.0 or less, more preferably of 1.5 to 3.5, and particularly preferably of 1.5 to 3.0.

When the molecular weight distribution (Mw/Mn) is less than or equal to 5.0, the crystalline higher α-olefin copolymer has narrow composition distribution, good surface properties and improved strength without tackiness.

Furthermore, the above-mentioned molecular weight distribution (Mw/Mn) is a value calculated from the weight-average molecular weight Mw and the number-average molecular weight Mn, both measured by the following apparatus under the following conditions with respect to polystyrene:

Apparatus for GPC Measurement
  Column: TOSO GMHHR-H(S) HT
  Detector: RI Detector for liquid chromatography, WATERS 150 C Measuring Conditions
  Solvent: 1,2,4-trichlorobenzene
  Temperature of measurement: 145° C.
  Flow rate: 1.0 ml/min
  Concentration of sample: 2.2 mg/ml
  Amount of injection: 160 µl
  Calibration curve: Universal Calibration
  Analytic program: HT-GPC (Ver. 1.0)

The crystalline higher α-olefin copolymer of the present invention has an isotactic structure, and the stereoregularity index M2 derived from the linkages of higher α-olefin units having 10 or more carbon atoms, is preferably greater than or equal to 50 mol %.

The index is more preferably in the range of 50 to 90 mol %, particularly preferably 55 to 85 mol %, and more preferably 55 to 75 mol %.

When the stereoregularity index M2 is 50 mol % or greater, the copolymer attains an isotactic structure, with the crystallinity of the copolymer being improved, and the copolymer has good surface properties and improved strength, without tackiness.

As such, by controlling the stereoregularity to a moderate extent or better, more preferably to a moderate extent, the object of the present invention may be achieved.

This stereoregularity index M2 was measured according to the method reported in T. Asakura, M. Demura, Y. Nishiyama, "Macromolecules, 24, 2334 (1991)".

That is, M2 can be obtained by using the observation that the $^{13}$C-NMR spectra of the $CH_2$ carbon atom at the α-position of a side chain present in a higher α-olefin are split reflecting the difference in stereoregularity.

A larger value of M2 indicates higher isotacticity, which leads to an enhancement in heat resistance and strength.

Meanwhile, the measurement of $^{13}$C-NMR is carried out using the following apparatus under the following conditions:

Apparatus: EX-400 manufactured by JEOL, Ltd.
Measuring temperature: 130° C.
Pulse width: 45°
Number of accumulations: 1000 times
Solvent: a 90:10 (volume ratio) mixture of 1,2,4-trichlorobenzene and deuterated benzene Furthermore, the stereoregularity index M2 is calculated as follows:

Six large absorption peaks due to the solvent mixture appear in the range of 127 to 135 ppm.

Among these peaks, the fourth peak from the low magnetic field side is taken to be 131.1 ppm, set as the reference for the chemical shift.

Here, an absorption peak due to the $CH_2$ carbon at the α-position of a side chain is observed in the vicinity of 34 to 37 ppm.

Here, M2 (mol %) is calculated using the following equation:

$$M2=[(\text{integrated intensity at 36.2 to 35.3 ppm})/(\text{integrated intensity at 36.2 to 34.5 ppm})]\times 100$$

The crystalline higher α-olefin copolymer of the present invention preferably has a half-width (Wm) measured from the melting endothermic curve obtained using a differential scanning calorimeter (DSC), of 10° C. or less, more preferably 6° C. or less, and particularly preferably 2 to 4° C.

The half-width (Wm) means the width at 50% of the height of an endothermic peak obtained during the measurement of the melting point (Tm) with DSC, and a smaller value of this half-width indicates formation of homogeneous crystals and thus homogeneity of the material.

The half-width of a crystalline higher α-olefin copolymer being less than or equal to 10° C. implies rapid melting behavior.

For instance, when a crystalline higher α-olefin copolymer is used as a main component for a temperature-sensitive adhesive, the temperature range for the adhesive-to-non-adhesive switching becomes narrower, and the adhesive force can correspond to abrupt temperature changes. This is preferred as it leads to an enhancement of temperature-sensitivity.

The crystalline higher α-olefin copolymer of the present invention can be prepared by using metallocene catalysts described below, and inter alia, it is preferred to use transition metal compounds with $C_2$-symmetry and $C_1$-symmetry which are capable of synthesis of isotactic polymers.

That is, the present invention provides a process of copolymerizing at least two higher α-olefins having 10 or more carbon atoms, or copolymerizing at least one higher α-olefin having 10 or more carbon atoms with at least one other olefin, in the presence of a polymerization catalyst containing (A) a transition metal compound represented by the following formula (I), and (B) a compound capable of forming an ionic complex by reacting with the transition metal compound of the component (A) or its derivative (B-1) and at least one component selected from aluminoxanes (B-2):

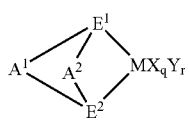
(I)

(wherein M represents a metallic element of Groups 3 to 10 of the Periodic Table or the lanthanoid series;

Each of $E^1$ and $E^2$ represents a ligand selected from a substituted cyclopentadienyl group, an indenyl group, a substituted indenyl group, a heterocyclopentadienyl group, a substituted heterocyclopentadienyl group, an amido group, a phosphido group, a hydrocarbon group or a silicon-containing group, they form a crosslinked structure via $A^1$ and $A^2$, and they may be the same or different from each other;

X represents a σ-bonding ligand, and a plurality of X, if any, may be the same or different from each other, and may be crosslinked with other X, $E^1$, $E^2$ or Y;

Y represents a Lewis base, and a plurality of Y, if any, may be the same or different from each other, and may be crosslinked with other Y, $E^1$, $E^2$ or X;

Each of $A^1$ and $A^2$ is a divalent crosslinking group via which the two ligands are bonded to each other and represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein R$^1$ represents a hydrogen atom, a halogen atom, a hydrocarbon group having 1 to 20 carbon atoms, or a halogen-containing hydrocarbon group having 1 to 20 carbon atoms, and they may be the same or different from each other;

q is an integer of from 1 to 5 and represents [(valency of M)–2]; and r represents an integer of from 0 to 3.)

In the above formula (I), M represents a metallic element of Groups 3 to 10 of the Periodic Table or lanthanoid series, and specific examples thereof include titanium, zirconium, hafnium, yttrium, vanadium, chromium, manganese, nickel, cobalt, palladium and lanthanoid metals. Among these, titanium, zirconium and hafnium are preferred from the perspective of the activity for olefin copolymerization.

Each of $E^1$ and $E^2$ represents a ligand selected from a substituted cyclopentadienyl group, an indenyl group, a substituted indenyl group, a heterocyclopentadienyl group, a substituted heterocyclopentadienyl group, an amido group (—N<), a phosphido group (—P<), hydrocarbon group [>CR—, >C<] or a silicon-containing group [>SiR—, >Si<], provided that R is a hydrogen atom, a hydrocarbon group having 1 to 20 carbon atoms, or a hetero atom-containing group, and they form a crosslinked structure via $A^1$ and $A^2$.

Further, $E^1$ and $E^2$ may be the same or different from each other.

For $E^1$ and $E^2$, preferred are a substituted cyclopentadienyl group, an indenyl group and a substituted indenyl group.

Furthermore, X represents a σ-bonding ligand, and a plurality of X, if any, may be the same or different from each other, and may be crosslinked with other X, $E^1$, $E^2$ or Y;

Specific examples of X include a halogen atom, a hydrocarbon group having 1 to 20 carbon atoms, an alkoxy group having 1 to 20 carbon atoms, an aryloxy group having 6 to 20 carbon atoms, an amido group having 1 to 20 carbon atoms, a silicon-containing group having 1 to 20 carbon atoms, a phosphido group having 1 to 20 carbon atoms, a sulfido group having 1 to 20 carbon atoms and an acyl group having 1 to 20 carbon atoms.

Meanwhile, Y represents a Lewis base, and a plurality of Y, if any, may be the same or different from each other, and may be crosslinked with other Y, $E^1$, $E^2$ or X.

Specific examples of the Lewis base of Y include amines, ethers, phosphines, and thioethers.

Next, each of $A^1$ and $A^2$ is a divalent crosslinking group via which the two ligands are bonded to each other and represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein R$^1$ represents a hydrogen atom, a halogen atom, a hydrocarbon group having 1 to 20 carbon atoms, or a halogen-containing hydrocarbon group having 1 to 20 carbon atoms, and they may be the same or different from each other;

Such a crosslinking group includes, for example, of a group represented by the following formula:

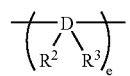

wherein D is carbon, silicon or tin; each of R$^2$ and R$^3$ represents a hydrogen atom, or a hydrocarbon group having 1 to 20 carbon atoms, and these may be the same or different from each other, or may be bonded to each other to form a cyclic structure; and e represents an integer of 1 to 4. Specific examples of the crosslinking group include a methylene group, an ethylene group, an ethylidene group, a propylidene group, an isopropylidene group, a cyclohexylidene group, a 1,2-cylcohexylene group, a vinylidene group (CH$_2$=C=), a dimethylsilylene group, a diphenylsilylene group, a methylphenylsilylene group, a dimethylgermylene group, a dimethylstannylene group, a tetramethyldisilylene group and a diphenyldisilylene group.

Of these, preferred are an ethylene group, an isopropylidene group, and a dimethylsilylene group.

q is an integer of 1 to 5 and represents [(valency of M)–2], and r represents an integer of 0 to 3.

Among the transition metal compounds represented by the formula (I), preferred is a transition metal compound having as a ligand a double-crosslinked biscyclopentadienyl derivative represented by the following formula (II):

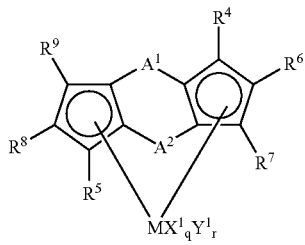

(II)

In the formula (II), M, A¹, A², q and r have the same meaning as in the formula (I).

X¹ represents a σ-bonding ligand, and a plurality of X¹, if any, may be the same or different and may be crosslinked to other X¹ or Y¹.

Specific examples of X¹ include the same as those exemplified for X in the formula (I).

Y¹ represents a Lewis base, and a plurality of Y¹, if any, may be the same or different and may be crosslinked to other Y¹ or X¹.

Specific examples of Y¹ include the same as those exemplified for Y in the formula (I).

Each of R⁴ to R⁹ represents a hydrogen atom, a halogen atom, a hydrocarbon group having 1 to 20 carbon atoms, a halogen-containing hydrocarbon group having 1 to 20 carbon atoms, a silicon-containing group or a heteroatom-containing group, with the proviso that at least one of R⁴ to R⁹ is required to be other than hydrogen.

Further, R⁴ to R⁹ may be the same or different from each other, and may be the same or different, and adjacent groups may be bonded to each other to form a ring.

In particular, R⁶ and R⁷ as well as R⁸ and R⁹ are preferably bonded to each other to form a ring each.

Each of R⁴ and R⁵ is preferably a group containing a hetero atom such as oxygen, halogen and silicon, because the copolymerization activity is enhanced.

In the transition metal compounds having such a double-crosslinked biscyclopentadienyl derivative as the ligand, a crosslinking group via which the ligands are bonded to each other, preferably comprises a silicon-containing group.

Specific examples of the transition metal compounds of the formula (I) include (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'-ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-di-isopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl)zirconium dichloride, (1,2'-dimethylsilylene)(2,1'-dimethylsilylene)-bis(3-methylindenyl)zirconium dichloride, (1,2'-dimethylsilylene)(2,1'-dimethylsilylene)-bis(3-n-butylindenyl)zirconium dichloride, (1,2'-dimethylsilylene)(2,1'-dimethylsilylene)-bis(3-i-propylindenyl)zirconium dichloride, (1,2'-dimethylsilylene)(2,1'-dimethylsilylene)-bis(3-trimethylsilylmethylindenyl)zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-di-i-propylindenyl)zirconium dichloride, (1,2'-dimethylsilylene)(2,1'-dimethylsilylene)-bis(4-phenylindenyl)zirconium dichloride, (1,2'-dimethylsilylene)(2,1'-dimethylsilylene)-bis(3-methyl-4-i-propylindenyl)zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-i-propylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl)zirconium dichloride, (1,2'-dimethylsilylene)(2,1'-methylene)-bis(3-i-propylindenyl)zirconium dichloride, (1,2'-dimethylsilylene)(2,1'-methylene)-bis(3-n-butylindenyl)zirconium dichloride, (1,2'-dimethylsilylene)(2,1'-methylene)-bis(3-trimethylsilylmethylindenyl)zirconium dichloride, (1,2'-dimethylsilylene)(2,1'-methylene)-bis(3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene)(2,1'-methylene)-bis(3-i-propylindenyl)zirconium dichloride, (1,2'-diphenylsilylene)(2,1'-methylene)-bis(3-n-butylindenyl)zirconium dichloride, (1,2'-diphenylsilylene)(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl)zirconium dichloride, (1,2'- dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-i-propylcyclopentadienyl)(3'-methyl-5'-1-propylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-i-propylcyclopentadienyl)(3'-methyl-5'-i-propylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-i-propylcyclopentadienyl)(3'-methyl-5'-i-propylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-i-propylcyclopentadienyl)(3'-methyl-5'-i-propylcyclopentadienyl)zirconium dichloride, (1,2'-ethylene)(2,1'-isopropylidene)(3-methyl-5-i-propylcyclopentadienyl)(3'-methyl-5'-1-propylcyclopentadienyl)zirconium dichloride, (1,2'-methylene)(2,1'-methylene)(3-methyl-5-i-propylcyclopentadienyl)(3'-methyl-5'-i-propylcyclopentadienyl)zirconium dichloride, (1,2'-methylene)(2,1'-isopropylidene)(3-methyl-5-i-propylcyclopentadienyl)(3'-methyl-5'-i-propylcyclopentadienyl)zirconium dichloride, (1,1'-dimethylsilylene)(2,2'-dimethylsilylene)bisindenylzirconium dichloride, (1,1'-diphenylsilylene)(2,2'-dimethylsilylene)bisindenylzirconium dichloride, (1,1'-dimethylsilylene)(2,2'-dimethylsilylene)bisindenylzirconium dichloride, (1,1'-diisopropylsilylene)(2,2'-dimethylsilylene)bisindenylzirconium dichloride, (1,1'-dimethylsilylene)(2,2'-diisopropylsilylene)bisindenylzirconium dichloride, (1,1'-dimethylsilyleneindenyl)(2,2'-dimethylsilylene-3-trimethylsilylindenyl)zirconium dichloride (1,1'-diphenylsilyleneindenyl)(2,2'-diphenylsilylene-3-trimethylsilylindenyl)zirconium dichloride (1,1'-diphenylsilyleneindenyl)(2,2'-dimethylsilylene-3-trimethylsilylindenyl)zirconium dichloride, (1,1'-dimethylsilylene)(2,2'-dimethylsilylene)(indenyl)(3-trimethylsilylindenyl)zirconium dichloride, (1,1'-diphenylsilylene)(2,2'-diphenylsilylene)(indenyl)(3-trimethylsilylindenyl)zirconium dichloride, (1,1'-diphenylsilylene)(2,2'-dimethylsilylene)(indenyl)(3-trimethylsilylindenyl)zirconium dichloride, (1,1'-dimethylsilylene)(2,2'-diphenylsilylene)(indenyl)(3-trimethylsilylindenyl)zirconium dichloride, (1,1'-diisopropylsilylene)(2,2'-dimethylsilylene)(indenyl)(3-trimethylsilylindenyl)zirconium dichloride, (1,1'-dimethylsilylene)(2,2'-diisopropylsilylene)(indenyl)(3-trimethylsilylindenyl)zirconium dichloride, (1,1'-diisopropylsilylene)(2,2'-diisopropylsilylene)(indenyl)(3-trimethylsilylindenyl)zirconium dichloride, (1,1'-dimethylsilylene)(2,2'-dimethylsilylene)(indenyl)(3-trimethylsilylmethylindenyl)zirconium dichloride, (1,1'-diphenylsilylene)(2,2'-diphenylsilylene)(indenyl)(3-trimethylsilylmethylindenyl)zirconium dichloride, (1,1'-diphenylsilylene)(2,2'-dimethylsilylene)(indenyl)(3-trimethylsilylmethylindenyl)zirconium dichloride, (1,1'-dimethylsilylene)(2,2'-diphenylsilylene)(indenyl)(3-trimethylsilylmethylindenyl)zirconium dichloride, (1,1'-diisopropylsilylene)(2,2'-dimethylsilylene)(indenyl)(3-trimethylsilylmethylindenyl)zirconium dichloride, (1,1'-dimethylsilylene)(2,2'-diisopropylsilylene)(indenyl)(3-trimethylsilylmethylindenyl)zirconium dichloride, (1,1'-diisopropylsilylene)(2,2'-diisopropylsilylene)(indenyl)(3-trimethylsilylmethylindenyl)zirconium dichloride, etc. and compounds obtained by substituting zirconium contained in these compounds with titanium or hafnium.

It is a matter of course that the examples shall not be limited to these compounds.

In addition, it may be similar compounds of metallic elements of other Groups and lanthanoid series.

In addition, in the compound, (1,1'-)(2,2'-) may be (1,2'-)(2,1'-) and (1,2'-)(2,1'-) may be (1,1'-)(2,2'-).

Next, as component (B-1) of component (B), any of those compounds capable of forming an ionic complex by reacting with the transition metal compound of the component (A) may be used, and those represented by the following formulas (III) and (IV) can be very appropriately used:

  (III)

  (IV)

(here $L^2$ is $M^2$, $R^{11}R^{12}M^3$, $R^{13}{}_3C$ or $R^{14}M^3$.)

(In formulas (III) and (IV), $L^1$ is a Lewis base; $[Z]^-$ is non-coordinated anions $[Z^1]^-$ and $[Z^2]^-$ wherein $[Z^1]^-$ is an anion having a plurality of groups bonded to an element, i.e., [M¹G¹G² ... G^f]⁻, (wherein M¹ represents an element of Groups 5 to 15 of the Periodic Table of Elements, preferably an element of Groups 13 to 15 of the Periodic Table, each of G¹ to G^f represents a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6–20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a heteroatom-containing hydrocarbon group having 2 to 20 carbon atoms, two or more of G¹ to G^f may form a cyclic structure, and f represents an integer of [(valency of the central metal M¹)+1]) and [Z²]⁻ represents a single Brensted acid having a logarithmic value of the reciprocal of acid-dissociation constant (pKa) of −10 or less, or a conjugated base of combined Brensted acid and Lewis acid, i.e., a conjugated base for an acid generally defined as a super acid, or may be coordinated by a Lewis base; R¹⁰ represents a hydrogen atom, an alkyl group having 1 to 20 carbon atoms, an aryl group having 6 to 20 carbon atoms, an alkylaryl group or an arylalkyl group; each of R¹¹ and R¹² represents a cyclopentadienyl group, a substituted cyclopentadienyl group or an indenyl group or a fluorenyl group; R¹³ represents an alkyl group having 1 to 20 carbon atoms, an aryl group, an alkylaryl group or an arylalkyl group; R¹⁴ represents a macrocyclic ligand such tetraphenylporphyrin or phthalocyanine; k is the ionization value of [L¹−R¹⁰] or [L²] and is an integer of 1 to 3; a is an integer of 1 or more; b=(k×a); M² comprises an element of Groups 1 to 3, 11 to 13 and 17 of the Periodic Table; and M³ represents an element of Groups 7 to 12 of the Periodic Table.)

Herein, specific examples of L¹ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline, phosphines such as triethylphosphine, triphenylphosphine and diphenylphosphine, thioethers such as tetrahydrothiophene, esters such as ethyl benzoate and nitriles such as acetonitrile and benzonitrile.

Specific examples of R¹⁰ include hydrogen, methyl, ethyl, benzyl and triethyl and specific examples of R¹¹ and R¹² include cyclopentadienyl, methylcyclopentadienyl, ethylcyclopentadienyl and pentamethylcyclopentadienyl.

Specific examples of R¹³ include phenyl, p-tolyl and p-methoxyphenyl and specific examples of R¹⁴ include tetraphenylporphyrin, phthalocyanine, allyl and methallyl.

In addition, specific examples of M² include Li, Na, K, Ag, Cu, Br, I and I₃ and specific examples of M³ include Mn, Fe, Co, Ni and Zn.

Further, in [Z¹]⁻, that is, [M¹ G¹ G² ... G^f], specific examples of M¹ include B, Al, Si, P, As and Sb, and B and Al are preferred.

Further, specific examples of G¹, and G² to G^f include a dialkylamino group such as dimethylamino and diethylamino; an alkoxy group or aryloxy group such as methoxy, ethoxy, n-butoxy and phenoxy; a hydrocarbon group such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl; a halogen atom such as fluorine, chlorine, bromine and iodine; a hetero atom-containing hydrocarbon group such as p-fluorophenyl, 3,5-difluorophenyl, pentachlorophenyl, 3,4,5-trifluorophenyl, pentafluorophenyl, 3,5-bis(trifluoromethyl)phenyl and bis(trimethylsilyl)methyl; and an organic metalloid group such as pentamethylantimony, trimethylsilyl, trimethylgermyl, diphenylarsine, dicyclohexyantimony and diphenylboron.

In addition, specific examples of a non-coordinating anion, that is, the Brensted acid alone in which pKa is −10 or less or a conjugate base [Z²]⁻ obtained by combining a Brensted acid with a Lewis acid are a trifluoromethanesulfonic acid anion (CF₃SO₃)⁻, bis(trifluoromethanesulfonyl)methyl anion, bis(trifluoromethanesulfonyl)benzyl anion, bis(trifluoromethanesulfonyl)amide, perchlorate anion (ClO₄)⁻, trifluoroacetic acid anion (CF₃CO₂)⁻, hexafluoroantimony anion (SbF₆)⁻, fluorosulfonic acid anion (FSO₃)⁻, chlorosulfonic acid anion (ClSO₃)⁻, fluorosulfonic acid anion/antimony pentafluoride (FSO₃/SbF₅)⁻, fluorosulfonic acid anion/arsenic pentafluoride (FSO₃/AsF₅)⁻ and trifluoromethanesulfonic acid anion/antimony pentafluoride (CF₃SO₃/SbF₅)⁻.

Specific examples of the ionic compound which is reacted with the transition metal compound of the component (A) described above to form an ionic complex, that is, the (B-1) component compound include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl (methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis (pentafluorophenyl)borate, tetra-n-butylammonium tetrakis (pentafluorophenyl)borate, tetraethylammonium tetrakis (pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl) phenyl]borate, ferrocenium tetraphenylborate, silver tetraphenylborate, trityl tetraphenylborate, tetraphenylporphyrin-manganese tetraphenylborate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrin-manganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate.

The (B-1) component may be used alone or in combination of two or more kinds thereof.

On the other hand, the aluminoxanes of the (B-2) component include chain aluminoxanes represented by the formula (V):

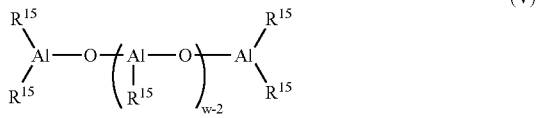

(V)

(wherein $R^{15}$ represents a hydrocarbon group, such as an alkyl, alkenyl, aryl or arylalkyl group having 1 to 20, preferably 1 to 12 carbon atoms, or represents a halogen atom; w represents a mean degree of polymerization of the compound and is generally an integer of 2 to 50, preferably to 40; and each $R^{15}$ may be the same or different from each other) and cyclic aluminoxanes represented by the formula (VI):

(VI)

(wherein $R^{15}$ and w have the same meanings as in the formula (V).)

As the process for producing the above aluminoxane, a process in which an alkylaluminum is brought into contact with a condensation agent such as water can be conducted. However, the process is not particularly limited and any conventional process may be conducted.

Examples of the process include (a) a process in which an organoaluminum compound is dissolved in an organic solvent and the solution is brought into contact with water, (b) a process in which an organoaluminum compound is added into a mixture for polymerization in advance and water is added to the mixture thereafter, (c) a process in which crystal water contained in a metal salt or water adsorbed to an inorganic substance or an organic substance is brought into reaction with an organoaluminum compound and (d) a process in which a tetraalkyldialuminoxane is reacted with a trialkylaluminum and the product is further reacted with water.

Further, an aluminoxane insoluble in toluene may be used.

These aluminoxanes may be used alone or in combination of two or more kinds.

For the ratio of catalyst component (A) and catalyst component (B) for the use in the present invention, if compound (B-1) is used as catalyst component (B), the molar ratio is preferably in the range of 10:1 to 1:100, and more preferably 2:1 to 1:10. Within these ranges, the catalyst cost per unit mass of polymer is not high and thus is practicable.

Furthermore, if compound (B-2) is used, the molar ratio is preferably in the range of 1:1 to 1:1,000,000, and more preferably 1:10 to 1:10,000.

Within these ranges, the catalyst cost per unit mass of polymer is not high and thus is practicable.

Further, for catalyst component (B), (B-1) and (B-2) may be used alone or in combination of two or more kinds.

Further, as the catalyst for polymerization used in preparation of the crystalline higher α-olefin copolymer of the present invention, an organoaluminum compound can be used as component (C), in addition to component (A) and component (B).

Here, as the organoaluminum compound of component (C), used is a compound represented by the following formula (VII):

(VII)

(wherein $R^{16}$ represents an alkyl group having 1 to 10 carbon atoms, J represents a hydrogen atom, an alkoxy group having 1 to 20 carbon atoms, an aryl group having 6 to 20 carbon atoms or a halogen atom, and v represents an integer of 1 to 3.)

Specific examples of the compounds of the above formula (VII) include trimethylaluminium, triethylaluminium, triisopropylaluminium, triisobutylaluminium, dimethylaluminium chloride, diethylaluminium chloride, methylaluminium dichloride, ethylaluminium dichloride, dimethylaluminium fluoride, diisobutylaluminium hydride, diethylaluminium hydride, and ethylaluminium sesquichloride.

These organoaluminium compounds may be used alone or in combination of two or more kinds.

For the ratio of catalyst component (A) and catalyst component (C) for the use in the present invention, the molar ratio is preferably in the range of 1:1 to 1:10,000, more preferably 1:5 to 1:2,000, and even more preferably 1:10 to 1:1,000.

The activity for copolymerization per transition metal unit can be improved by using the catalyst component (C). However, an excessive use of the component (C) makes the organoaluminum compound wasteful and also leaves the component (C) in large quantities in the copolymer, thus not preferable.

In the process for preparation of crystalline higher α-olefin copolymer of the present invention, at least one catalyst component can be used as supported on a suitable carrier.

The type of such carrier is not particularly limited, and any of inorganic oxide carriers, other inorganic carriers and organic carriers can be used, but particularly preferred are inorganic oxide carriers and other inorganic carriers.

For the crystalline higher α-olefin copolymer of the present invention, the method of polymerization is not particularly limited, and any of methods such as slurry polymerization, vapor-phase polymerization, bulk polymerization, solution polymerization, and suspension polymerization may be used. Among these, slurry polymerization and vapor-phase polymerization methods are particularly preferred.

For the conditions for copolymerization, the copolymerization temperature is generally in the range of −100 to 250° C., preferably −50 to 200° C., and more preferably 0 to 130° C.

The time for copolymerization is typically 5 minutes to 10 hours, and the reaction pressure is preferably in the range of normal pressure to 20 MPa (gauge), more preferably normal pressure to 10 MPa (gauge).

In the process for the preparation of the crystalline higher α-olefin copolymer of the present invention, it is preferable that hydrogen is added since the activity for the copolymerization is enhanced.

When hydrogen is used, its pressure is typically in the range of normal pressure to 5 MPa (gauge), preferably normal pressure to 3 MPa (gauge), and more preferably normal pressure to 2 MPa (gauge).

When a solvent is used for the copolymerization, an aromatic hydrocarbon such as benzene, toluene, xylene and ethylbenzene, an alicyclic hydrocarbon such as cyclopentane, cyclohexane and methylcyclohexane, an aliphatic hydrocarbon such as pentane, hexane, heptane and octane or a halogenated hydrocarbon such as chloroform and dichloromethane can be used as the solvent.

These solvents may be used alone or in combination of two or more kinds.

In addition, a monomer such as α-olefin may be used as the solvent.

Further, the copolymerization may be conducted without using any solvents depending on the method of the copolymerization.

In the copolymerization, a preliminary polymerization may be conducted using the above polymerization catalyst.

The preliminary polymerization can be conducted, for example, by bringing a small amount of an olefin into contact with a solid component of the catalyst. The process of the preliminary polymerization is not particularly limited and a conventional process can be used. The olefin used for the preliminary polymerization is not particularly limited and those exemplified in the above, for example, ethylene, an olefin having 3 to 20 carbon atoms or a mixture of these olefins may be used. It is advantageous to use the same olefin as the higher α-olefin or the olefin used for the copolymerization.

The temperature of the preliminary polymerization is, in general, in the range of −20 to 200° C., preferably in the range of −10 to 130° C. and more preferably in the range of 0 to 80° C.

In the preliminary polymerization, aliphatic hydrocarbons, aromatic hydrocarbons, monomers, etc. may be used as the solvent.

Among these solvents, aliphatic hydrocarbons are particularly preferable.

Further, the preliminary polymerization may be conducted without any solvents.

In the preliminary polymerization, it is preferable that the condition of the polymerization is adjusted so that the product of the preliminary polymerization has an intrinsic viscosity [η] (as measured in decaline at 135° C.) of 0.1 dl/g or greater and the amount of the product of the preliminary polymerization is in the range of 1 to 10,000 g and more preferably in the range of 10 to 1,000 g per 1 mmol of the transition metal component of the catalyst.

In addition, the molecular weight of the polymer can be adjusted by suitably selecting the type and the amount of the catalyst components and the temperature of copolymerization. The molecular weight can further be adjusted by conducting the copolymerization in the presence of hydrogen.

An inert gas such as nitrogen gas may be present during the copolymerization.

As such, it is possible to obtain a crystalline higher α-olefin copolymer efficiently by the process of the present invention, and it is possible to obtain a crystalline higher α-olefin copolymer which has excellent low temperature properties, stiffness, heat resistance, compatibility with lubricants, miscibility with inorganic fillers, and secondary processability.

EXAMPLES

Next, the present invention will be described in more detail by the following Examples, but the present invention is by no means limited by these Examples.

First, the methods of evaluation for the physical properties of the crystalline higher α-olefin copolymers of the present invention will be explained.

(1) DSC Measurement

Using a differential scanning calorimeter (manufactured by Perkin-Elmer, DSC-7), ten milligrams of a sample was maintained at 190° C. for 5 minutes under a nitrogen atmosphere, the sample was cooled to −10° C. at 5° C./min and maintained at −10° C. for 5 minutes, the temperature of the sample was elevated to 190° C. at 10° C./min to obtain the melting endothermic (ΔH) curve of the sample, and then the melting point (Tm) of the peaktop of a peak observed in the melting endothermic curve was measured.

(2) Distribution of Wide-Angle X-Ray Scattering Intensity

It was measured by the procedure described in the detailed description of the present invention.

(3) Weight-Average Molecular Weight (Mw) and Molecular Weight Distribution (Mw/Mn)

It was measured by the procedure described in the detailed description of the present invention.

(4) Stereoregularity Index M2

It was measured by the procedure described in the detailed description of the present invention.

(5) Half-Width (Wm)

It was measured by the procedure described in the detailed description of the present invention.

Preparative Example 1 for Catalyst (a) Preparation of (1,2'-dimethylsilylene)(2,1'-dimethylsilylene)-bis(3-trimethylsilylmethylindenyl) dizirconium chloride Into a 200 ml-Schlenk bottle, 2.5 g (7.2 mmol) of (1,2'-dimethylsilylene)(2,1'-dimethylsilylene)-bis(indene) and 100 ml of ether were added under a nitrogen stream.

The mixture was cooled to −78° C., 9.0 ml (14.8 mmol) of a solution of n-butyllithium (n-BuLi) in hexane (1.6 mol/liter) was added, and then the mixture was stirred at room temperature for 12 hours.

The solvent was distilled off, and by drying the solid thus obtained, after washing with 20 ml of hexane, under reduced pressure a lithium salt was obtained as a white solid in a quantitative yield.

In a Schlenk bottle, the lithium salt of (1,2'-dimethylsilylene)(2,1'-dimethylsilylene)-bis(indene) (6.97 mmol) was dissolved in 50 ml of tetrahydrofuran (THF), 2.1 ml (14.2 mmol) of iodomethyltrimethylsilane was slowly added dropwise to the solution at room temperature, and the mixture was stirred for 12 hours.

The solvent was distilled off, 50 ml of ether was added, and the mixture was washed with a saturated solution of ammonium chloride.

After separation of the mixture, the organic phase was dried to remove the solvent, and 3.04 g (5.9 mmol) of (1,2'-dimethylsilylene)(2,1'-dimethylsilylene)-bis(3-trimethylsilylmethylindene) was obtained (yield: 84%).

Then, into a Schlenk bottle, 3.04 g (5.9 mmol) of the above obtained (1,2'-dimethylsilylene)(2,1'-dimethylsilylene)-bis(3-trimethylsilylmethylindene) and 50 ml of ether were added under a nitrogen stream.

The mixture was cooled to −78° C., 7.4 ml (11.8 mmol) of a solution of n-butyllithium (n-BuLi) in hexane (1.6 mol/liter) was added, and then the mixture was stirred at room temperature for 12 hours.

The solvent was distilled off, the solid thus obtained was washed with 40 ml of hexane, and 3.06 g of a lithium salt was obtained as an ether adduct.

The product was subjected to $^1$H-NMR to give the following results:

$^1$H-NMR (90 MHz, THF-d$_8$): δ 0.04 (s, —SiMe$_3$, 18H), 0.48 (s, -Me$_2$Si—, 12H), 1.10 (t, —CH$_3$, 6H), 2.59 (s, —CH$_2$—, 4H), 3.38 (q, —CH$_2$—, 4H), 6.2–7.7 (m, Ar—H, 8H).

Under a nitrogen stream, 3.06 g of the lithium salt obtained above was suspended in 50 ml of toluene.

The suspension was cooled to −78° C., and to this, a suspension of 1.2 g (5.1 mmol) of zirconium tetrachloride in toluene (20 ml) previously cooled to −78° C. was added dropwise.

After the addition, the mixture was stirred at room temperature for 6 hours.

The solvent of the reaction solution was distilled off, and the obtained residue was recrystallized from dichloromethane to yield 0.9 g (1.33 mmol) of (1,2'-dimethylsilylene)(2,1'-dimethylsilylene)-bis(3-trimethylsilylmethylindenyl)zirconium dichloride as a fine yellowish crystal (yield: 26%).

The product was subjected to $^1$H-NMR to give the following results:

$^1$H-NMR (90 MHz, CDCl$_3$): δ 0.0 (s, —SiMe$_3$-, 18H), 1.02, 1.12 (s, -Me$_2$Si—, 12H), 2.51 (dd, —CH$_2$—, 4H), 7.1–7.6 (m, Ar—H, 8H).

Example 1

In a 10-liter autoclave which was dried by heating, 2.8 kg of "Linearen 2024" (a mixture of predominantly α-olefins having 20, 22 and 24 carbon atoms), a product of Idemitsu Petrochemical Co., Ltd., and 4 liters of heptane were charged, the mixture was heated to the copolymerization temperature 60° C., subsequently 5 mmol of triisobutylaluminum, 20 μmol of (1,2'-dimethylsilylene)(2,1'-dimethylsilylene)-bis(3-trimethylsilylmethylindenyl)zirconium chloride and 40 μmol of dimethylanilinium tetrakis(pentafluorophenyl)borate were added, and copolymerization was carried out for 8 hours, with introducing 0.1 MPa of hydrogen.

After the completion of copolymerization reaction, the reaction product was precipitated in acetone, heated and dried under reduced pressure to yield 1.5 kg of a higher α-olefin copolymer.

The results of measured physical properties of the copolymer thus obtained are shown in Table 1.

Example 2

Into a 1-liter autoclave which was dried by heating, 200 ml of 1-octadecene (C$_{18}$) and 200 ml of heptane were added, the mixture was heated to the copolymerization temperature of 60° C., subsequently 0.5 mmol of triisobutylaluminum, 2 μmol of (1,2'-dimethylsilylene)(2,1'-dimethylsilylene)-bis(3-trimethylsilylmethylindenyl)zirconium dichloride and 10 μmol of dimethylanilinium tetrakis(pentafluorophenyl)borate were added, and copolymerization was carried out for 8 hours, by further introducing 0.1 MPa of hydrogen and 0.03 MPa of ethylene.

After the completion of copolymerization reaction, the reaction product was precipitated in acetone, heated and dried under reduced pressure to yield 32 g of a higher α-olefin copolymer.

The results of measured physical properties of the copolymer thus obtained are shown in Table 1.

Example 3

In a 1-liter autoclave which was dried by heating, 400 ml of a heptane solution containing 140 g of "Linearen 2024" (a mixture of predominantly α-olefins having 20, 22 and 24 carbon atoms), a product of Idemitsu Petrochemical Co., Ltd., 40 ml of 1-butene were charged, 0.1 MPa of hydrogen was introduced, and the mixture was heated under pressure at the copolymerization temperature of 60° C.

Then, 5 mmol of triisobutylaluminum, 5 μmol of (1,2'-dimethylsilylene)(2,1'-dimethylsilylene)-bis(3-trimethylsilylmethylindenyl)zirconium dichloride and 25 μmol of dimethylanilinium tetrakis(pentafluorophenyl)borate were added, and copolymerization was carried out for 120 minutes.

After the completion of copolymerization reaction, the reaction product was precipitated in acetone, heated and dried under reduced pressure to yield 17.6 g of a higher α-olefin copolymer.

The results of measured physical properties of the copolymer thus obtained are shown in Table 1.

Example 4

In a 1-liter autoclave which was dried by heating, 400 ml of a heptane solution containing 140 g of "Linearen 2024" (a mixture of predominantly α-olefins having 20, 22 and 24 carbon atoms), a product of Idemitsu Petrochemical Co., Ltd., 20 ml of 1-butene were charged, 0.1 MPa of hydrogen was introduced, and the mixture was heated under pressure at the copolymerization temperature of 60° C.

Then, 5 mmol of triisobutylaluminum, 5 μmol of (1,2'-dimethylsilylene)(2,1'-dimethylsilylene)-bis(3-trimethylsilylmethylindenyl)zirconium dichloride and 25 μmol of dimethylanilinium tetrakis(pentafluorophenyl)borate were added, and copolymerization was carried out for 120 minutes.

After completion of the copolymerization reaction, the reaction product was precipitated in acetone, heated and dried under reduced pressure to yield 24.0 g of a higher α-olefin copolymer.

The results of measured physical properties of the copolymer thus obtained are shown in Table 1.

Example 5

Into a 1-liter autoclave which was dried by heating, 100 ml of 1-hexadecene (C$_{16}$), 100 ml of 1-octadecene (C$_{18}$) and 200 ml of heptane were added, the mixture was heated to the copolymerization temperature of 60° C., subsequently 4.0 mmol of triisobutylaluminum, 4 μmol of (1,2'-dimethylsilylene)(2,1'-dimethylsilylene)-bis(3-trimethylsilylmethylindenyl)zirconium dichloride and 4 μmol of methylaluminoxane were added, and copolymerization was carried out for 2 hours, by further introducing 0.05 MPa of hydrogen.

After the completion of copolymerization reaction, the reaction product was precipitated in acetone, heated and dried under reduced pressure to yield 92 g of a higher α-olefin copolymer.

The results of measured physical properties of the copolymer thus obtained are shown in Table 1.

Comparative Example 1 for Catalyst Preparation (a) Preparation of a Solid Catalyst Component A three-necked flask with an inner volume of 0.5 liter equipped with a stirrer was purged with nitrogen gas, and then 80 ml of dehydrated heptane and 4.0 g (35 ml) of diethoxymagnesium were added.

Subsequently, the mixture was heated to 80° C., and then 13.2 mmol of n-dibutyl phthalate was added.

This solution was maintained at 80° C., and 116 ml (1.06 mol) of titanium tetrachloride was added, and then the mixture was stirred at an inner temperature of 110° C. for 2 hours to carry out the carrying operation.

Next, the above mixture was sufficiently washed with dehydrated heptane.

Further, 116 ml (1.06 mol) of titanium tetrachloride was added, and the mixture was heated to an inner temperature of 110° C. while stirring for 2 hours to carry out the second carrying operation.

Then, the mixture was washed sufficiently with dehydrated heptane to obtain a solid catalyst component (titanium amount carried: 1.21% by mass).

Comparative Example 1

In a 1-liter autoclave which was dried by heating, 400 ml of a heptane solution containing 140 g of "Linearen 2024" (a mixture of predominantly α-olefins having 20, 22 and 24 carbon atoms), a product of Idemitsu Petrochemical Co., Ltd., 0.8 mmol of triisobutylaluminum, 40 μmol of dicyclopentyldimethoxysilane and 8 μmol of the solid catalyst component in terms of titanium metal were charged, and the mixture was heated to the copolymerization temperature of 80° C., and copolymerization was carried out for 120 minutes, by further introducing 0.05 MPa of hydrogen.

After the completion of copolymerization reaction, the reaction product was precipitated in acetone, heated and dried under reduced pressure to yield 14 g of a higher α-olefin copolymer.

The results of measured physical properties of the copolymer thus obtained are shown in Table 1.

INDUSTRIAL APPLICABILITY

The crystalline higher α-olefin copolymers of the present invention which are obtained by copolymerizing at least two higher α-olefins having 10 or more carbon atoms or at least one higher α-olefin having 10 or more carbon atoms with at least one other olefin, allow easy control of the melting point and crystallinity compared to homopolymers, and thus exhibit improved secondary processability and solubility in solvents.

Therefore, the crystalline higher α-olefin copolymers of the present invention can be used appropriately as an adhesive, a modifying agent for oils and resins, in particular as a wax and a modifying agent for wax.

What is claimed is:

1. A crystalline higher α-olefin copolymer obtained by copolymerizing at least two higher α-olefins having 10 or more carbon atoms or at least one higher α-olefin having 10 or more carbon atoms with at least one other olefin, wherein it satisfies the following (1) to (3):
   (1): the content of higher α-olefin units is 50 mol % or greater,
   (2): the copolymer has a single melting point (Tm) which is measured, by using a differential scanning calorimeter (DSC), from the melting endothermic curve obtained by maintaining the copolymer at 190° C. for 5 minutes under a nitrogen atmosphere, cooling it to −10° C. at a rate of 5° C./min, maintaining it at −10° C. for 5 minutes, and then elevating its temperature to 190° C. at 10° C./min and which is in the range of 20 to 100° C., and
   (3): in the intensity distribution of wide-angle X-ray scattering, a single peak X1 resulting from crystallization of side chains is observed at 15 deg<2θ<30 deg.

2. The crystalline higher α-olefin copolymer according to claim 1, wherein the weight-average molecular weight (Mw) measured by gel permeation chromatography (GPC) with respect to polystyrene is in the range of 1,000 to 10,000,000, and the molecular weight distribution (Mw/Mn) is 5.0 or less.

3. The crystalline higher α-olefin copolymer according to claim 1, wherein the stereoregularity index M2 derived from the linkages of the higher α-olefins having 10 or more carbon atoms is 50 mol % or more.

TABLE 1

|  | Ex. | | | | | Comp. Ex. |
| --- | --- | --- | --- | --- | --- | --- |
| Table 1 | 1 | 2 | 3 | 4 | 5 | 1 |
| α-olefin Copolymer | $C_{20-24}$ | $C_{18}/C_2$ | $C_{20-24}/C_4$ | $C_{20-24}/C_4$ | $C_{18}/C_{16}$ | $C_{20-24}$ |
| Higher α-olefin unit (mol %) | 100 | 92.2 | 60.2 | 75.9 | 100 | 100 |
| Tm (° C.) | 48.6 | 40.0 | 39.2 | 42.9 | 32.2 | 41.8 |
|  |  |  |  |  |  | 67.7 |
| ΔH (J/g) | 81.8 | 87.7 | 57.4 | 62.3 | 67.1 | 90 |
| Wm (° C.) | 2.3 | 2.8 | 5.4 | 5.1 | 3.5 | 14.1 |
| Mw | 4.8E4 | 1.1E5 | 9.2E4 | 8.4E4 | 1.1E5 | 1.0E6 |
| Mw/Mn | 1.6 | 1.9 | 1.8 | 1.8 | 1.8 | 5.1 |
| M2 (mol %) | 56.9 | 64.5 | 40.1 | 43.9 | 68.4 | 86.3 |
| X1(°) | 21.3 | 21.2 | 21.4 | 21.4 | 21.0 | 20.7 |
|  |  |  |  |  |  | 23.3 |
| X1 intensity ratio (%) | 100 | 100 | 100 | 100 | 100 | 91.6 |
|  |  |  |  |  |  | 8.4 |

($C_{20-24}$: A mixture α-olefins having 20, 22 and 24 carbon atoms)

4. The crystalline higher α-olefin copolymer according to claim 1, wherein the half-width (Wm) which is measured from the melting endothermic curve obtained by using a differential scanning calorimeter is 10° C. or less.

5. The crystalline higher α-olefin copolymer according to claim 2, wherein the stereoregularity index M2 derived from the linkages of the higher α-olefins having 10 or more carbon atoms is 50 mol % or more.

6. The crystalline higher α-olefin copolymer according to claim 2, wherein the half-width (Wm) which is measured from the melting endothermic curve obtained by using a differential scanning calorimeter is 10° C. or less.

7. The crystalline higher α-olefin copolymer according to claim 3, wherein the half-width (Wm) which is measured from the melting endothermic curve obtained by using a differential scanning calorimeter is 10° C. or less.

8. The crystalline higher α-olefin copolymer according to claim 1, wherein the weight-average molecular weight (Mw) of the crystalline higher α-olefin copolymer measured by gel permeation chromatography (GPC) with respect to polystyrene is in the range of 1,000 to 10,000,000, and the molecular weight distribution (Mw/Mn) is 5.0 or less, the stereoregularity index M2 of the crystalline higher α-olefin copolymer derived from the linkages of the higher α-olefins having 10 or more carbon atoms is 50 mol % or more, and the half-width (Wm) of the crystalline higher α-olefin copolymer which is measured from the melting endothermic curve obtained by using a differential scanning calorimeter is 10° C. or less.

* * * * *